United States Patent
Wada et al.

(10) Patent No.: US 6,181,461 B1
(45) Date of Patent: Jan. 30, 2001

(54) OPTICAL SYSTEM HAVING STABLE RESONATOR

(75) Inventors: Hiroyuki Wada, Kanagawa; Hisashi Masuda, Tokyo; Kenji Kondo, Saitama; Michio Oka; Yuushi Kaneda, both of Tokyo, all of (JP)

(73) Assignee: Sony Corporation, Tokyo (JP)

( * ) Notice: Under 35 U.S.C. 154(b), the term of this patent shall be extended for 0 days.

(21) Appl. No.: 09/162,105

(22) Filed: Sep. 28, 1998

(30) Foreign Application Priority Data

Oct. 1, 1997 (JP) ...................................... 9-268506
Jan. 28, 1998 (JP) .................................. 10-015984

(51) Int. Cl.[7] .............. G02F 1/35; H01S 3/08; H01S 3/109
(52) U.S. Cl. .................. 359/326; 372/22; 372/98; 372/103
(58) Field of Search .................. 359/326–332; 372/21, 22, 43, 44, 98, 103

(56) References Cited

U.S. PATENT DOCUMENTS

| 3,628,186 | * | 12/1971 | Ashkin et al. | 359/330 X |
| 5,030,851 | * | 7/1991 | Unternahrer | 359/328 X |
| 5,050,179 | * | 9/1991 | Mooradian | 372/44 |
| 5,245,618 | | 9/1993 | Masuda et al. | 372/22 |

FOREIGN PATENT DOCUMENTS

| 4-233780 | 8/1992 | (JP) | H01S/3/081 |
| 7-104332 | 4/1995 | (JP) | G02F/1/37 |

OTHER PUBLICATIONS

M. Oka et al., "Second–Harmonic Generation Green Laser For Higher–Density,"Japan Journal of Applied Physics, vol. 31, pp. 513–518, Part 1, No. 2B, Feb. 1992.

M. Oka et al., "All–Solid–State Continuous Wave 0.1–W Ultraviolet Laser," Digest of The Conference on Laser And Electron–Optics, Paper No. CWQ7, May 13, 1992, pp. 90–10.

* cited by examiner

Primary Examiner—John D. Lee
(74) Attorney, Agent, or Firm—Limbach & Limbach L.L.P.

(57) ABSTRACT

In an optical system having at least one optical part other than mirrors, for example, a wavelength conversion optical system which uses an external resonator, an optical system which is capable of solving the problem of transverse mode generation due to the existence of scattering matter and the optical crystal used and capable of supplying a stable output (stable wavelength conversion output) is provided. At least at one point in a stable resonator having optical parts (optical crystal) other than mirrors, an aperture having a circular hole with a diameter 1 to 10 times the diameter of a beam at the aperture, a slit having a width 1 to 10 times the diameter of the beam, or an aperture of an arbitrary shape having an edge is located, or a knife edge having an linear or curved edge is Located so that the nearest distance between the edge and the beam is 1 to 10 times the radius of the beam from the center of the beam.

18 Claims, 5 Drawing Sheets

EFFECT OF FIRST EMBODIMENT (STABLE OUTPUT)

FIG. 6A
FIG. 6B
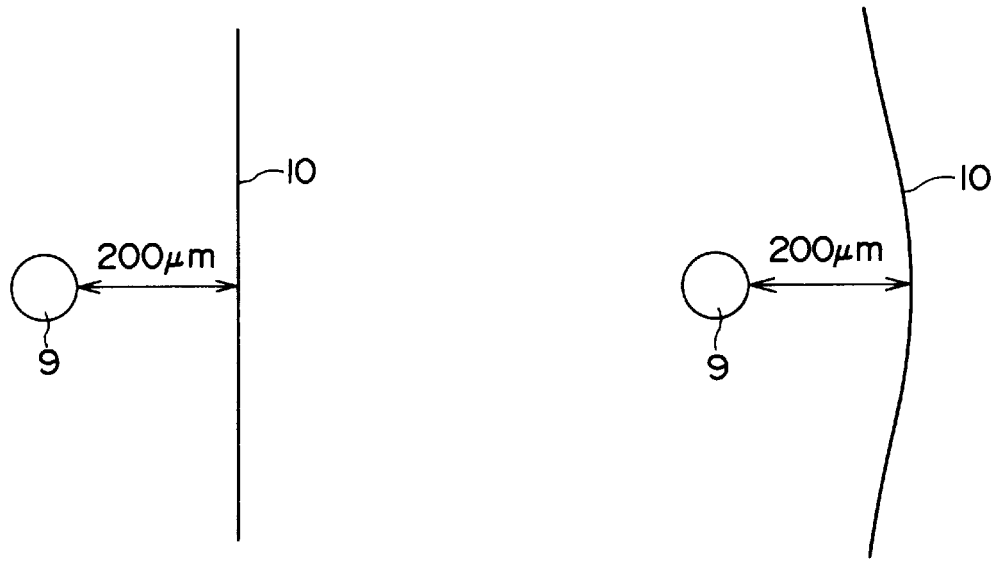
FIG. 8
PROBLEM OF PRIOR ART
(UNSTABLE OUTPUT)
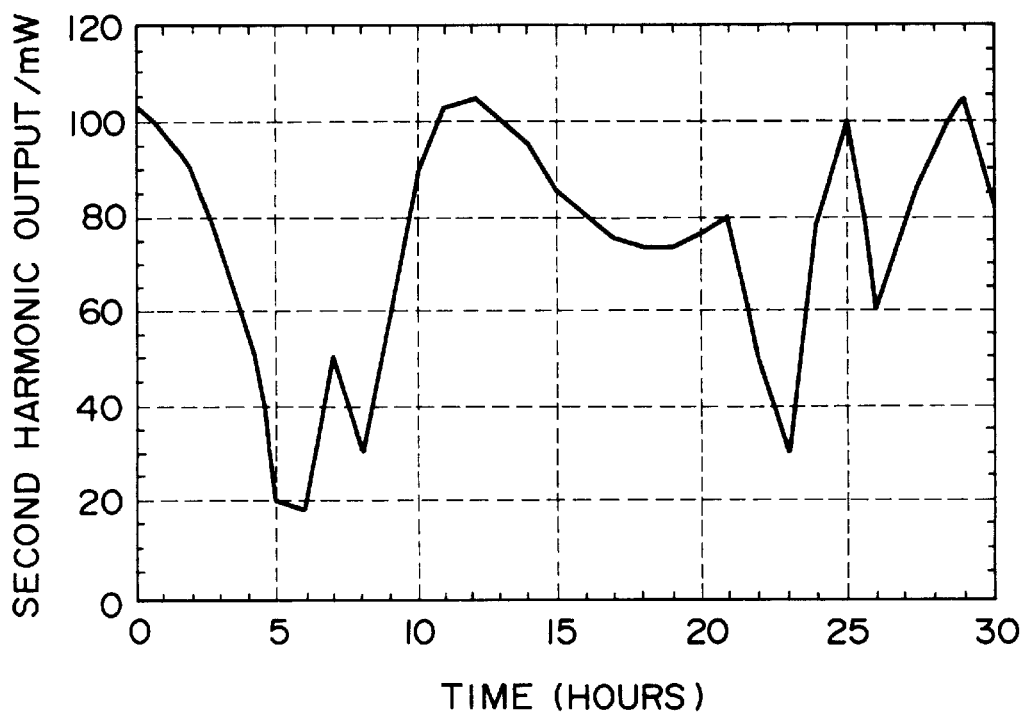

STRUCTURE OF EXTERNAL RESONATOR

OPTICAL SYSTEM HAVING STABLE RESONATOR

BACKGROUND OF THE INVENTION

1. Field of the Invention

This invention relates to an optical system having a stable resonator and more particularly to an optical system having a resonator which is used as an optical system for irradiating or generating ultraviolet rays (for example, ultraviolet light having a wavelength of 400 nm or shorter).

2. Description of Related Art

Heretofore, optical systems having a stable resonator have been involved in the problem of high order transverse mode generation. In detail, the existence of, for example, a scattering source in a resonator results in generation of a high order transverse mode in the resonator due to slight scattering from the scattering source. Because such high order transverse mode competes with the longitudinal mode, such generation of a high order transverse mode results in reduced longitudinal mode output in the resonator. Irregular generation of a high order transverse mode results in unstable longitudinal mode output in the resonator. Therefore, such generation of a high order transverse mode has been a problem in obtaining a stable longitudinal mode, particularly a constant stable longitudinal mode with time. Any optical system having at least one optical part other than mirrors in a stable resonator has been involved in such problem.

This problem is particularly more serious for wavelength conversion optical systems having an external resonator. In wavelength conversion using an external resonator (refer to M. Oka and S. Kubota, Jpn. J. Appl. Phys. Vol. 31 (1992) pp. 513 and M. Oka et. al., in Digest of Conference on Laser and Electron-Optics (OSA. Washington D.C. 1992), paper CWQ7), an external resonator is provided with an optical crystal for functioning as a wavelength conversion element, slight scattering due to impurities contained in the optical crystal and surface causes generation of a high order transverse mode in the resonator. The high order transverse mode results in reduced or unstable fundamental wave output in the resonator, and results in a reduced or unstable wavelength-converted harmonic. As described herein above, the above-mentioned generation of a transverse mode has been a problem in obtaining stable harmonic output in wavelength conversion optical systems having an external resonator.

The above-mentioned problem of the prior art will be described hereinunder with reference to drawings. For example, when a fundamental wave having a wavelength of 532 nm is converted to ultraviolet light having a wavelength of 266 nm using an external resonator, an external resonator having the structure shown in FIG. 7 has been used.

In FIG. 7, characters 1 to 3 represent high reflectance mirrors having ultra high reflectance, for example, as high as 99.95% or higher at the wavelength of 532 nm, character 4 represents an input (incident) mirror having a reflectance of, for example, 99% at the wavelength of 532 nm, and character 5 represents a non-linear optical crystal BBO, namely a wavelength conversion element provided with a low reflectance film of, for example, as low as 0.1% or lower at the wavelength of 532 nm. The high reflectance mirror 3 is placed on a VCM (refer to in the above-mentioned J. J. A. P) namely a positioning device though not shown in the drawing, and controlled by, for example, a servo driving system. As described herein above, the external resonator is composed of components shown with the characters 1 to 5.

A fundamental wave (wavelength of 532 nm) is irradiated onto the external resonator, amplified between the mirrors, and the amplified fundamental wave is converted to a second harmonic (wavelength of 266 nm in this case) by the non-linear optical crystal 5 (BBO). The second harmonic is shown with the arrow 7 in FIG. 7.

When the wavelength is converted as described herein above, a transverse mode due to scattering can be generated, particularly in the case of an external resonator as shown in FIG. 7, slight scattering due to photorefractive characteristics of the non-linear optical crystal 5 (BBO) increases to result in generation of the high transverse mode. As a result, the output of the fundamental wave having a wavelength of 532 which contributes to wavelength conversion is reduced.

The output of the second harmonic generated by wavelength conversion is formulated by the following equation:

$$P_2\omega = \gamma_{SH}(P\omega)^2$$

Wherein, $P\omega$ represents the output of the fundamental wave irradiated onto the non-linear optical crystal 5 (BBO), $P_2\omega$ represents the output of the second harmonic generated by wavelength conversion using the non-linear optical crystal 5, and $\gamma_{SH}$ represents a constant called a non-linear conversion factor determined from the crystal length of the non-linear optical crystal 5, the wavelength of the fundamental wave, the spot size, and a focusing parameter.

From this equation it is obvious that the output of the second harmonic $P_2\omega$ decreases with decreasing output of the fundamental wave $P\omega$, and the output of the second harmonic becomes unstable with irregular generation of a high order transverse mode.

Actually in wavelength conversion using the external resonator shown in FIG. 8, the second harmonic output (axis of ordinate, mW) exhibits unstable behavior with time (abscissa).

SUMMARY OF THE INVENTION

The present invention is accomplished to solve the above-mentioned problem of the prior art, and it is the object of the present invention to provide an optical system having a resonator (for example, a wavelength conversion optical system having an external resonator) which supplies a stable output (stable wavelength conversion output) without a transverse mode generation problem due to the existence of a scattering source and optical crystal used.

To attain the above-mentioned object, an optical system having a resonator according to the present invention has at least one optical part other than mirrors in the stable resonator, wherein the optical system is provided with, on at least one point in the stable resonator, an aperture having a circular hole with a diameter 1 to 10 times the beam diameter at each point.

In this patent specification, the diameter of a beam is defined as twice the distance between the point where the beam intensity decreases to $1/e^2$ of that at the center (the point where the beam intensity is maximum) and the center.

To attain the above-mentioned object, an optical system having a resonator which is an optical system having at least one optical part other than mirrors in a stable resonator is provided with, on at least one point in the stable resonator, a slit having a width 1 to 10 times the beam diameter at each point.

An optical system having a resonator which is a wavelength conversion optical system having a plurality of mirrors and an optical crystal for functioning as a wavelength conversion element in a resonator is provided with, on an arbitrary space in the stable resonator comprising the plurality of mirrors and optical crystal, an aperture having an edge of arbitrary shape.

An optical system having a resonator which is an optical system having at least one optical part other than mirrors in a stable resonator is provided with, on at least one point in the stable resonator, a knife edge having at least one linear or curved edge so that the nearest distance between the beam and the knife edge is 1 to 10 times the beam radius from the center of the beam.

According to the present invention, because on at least one point in a stable resonator an aperture having a circular hole with a diameter 1 to 10 times the beam diameter at each point, or a slit having a width 1 to 10 times, or an aperture having an edge of an arbitrary shape or at least one knife edge having a linear or curved edge provided so that the nearest distance from the beam is 1 to 10 times the beam radius from the beam center is provided, stable output is obtained likely due to suppressed transverse mode generation as the result of application of this structure.

In Japanese Patent Laid-open No. Hei-7-104332, an optical system in which a slit or aperture is provided is disclosed, however, in this case, the slit or aperture is provided outside a resonator to prevent unnecessary light radiation, therefore the constitution and effect of the above-mentioned invention are different from those of the present invention. In Japanese Patent Laid-open No. Hei-4-233780, a structure in which an aperture is provided in a negative branch type unstable resonator to cut the peripheral portion of a laser beam is disclosed, however, in this case, an unstable resonator is addressed differently from a stable resonator in the present invention, and in addition the effect of the aperture is different from the present invention.

BRIEF DESCRIPTION OF THE DRAWINGS

FIG. 6A and FIG. 6B are diagrams for illustrating a structure of a third embodiment of the present invention.

FIG. 8 is a graph for describing a problem of the prior art.

DETAILED DESCRIPTION OF THE PREFERRED EMBODIMENTS

Figure 1:
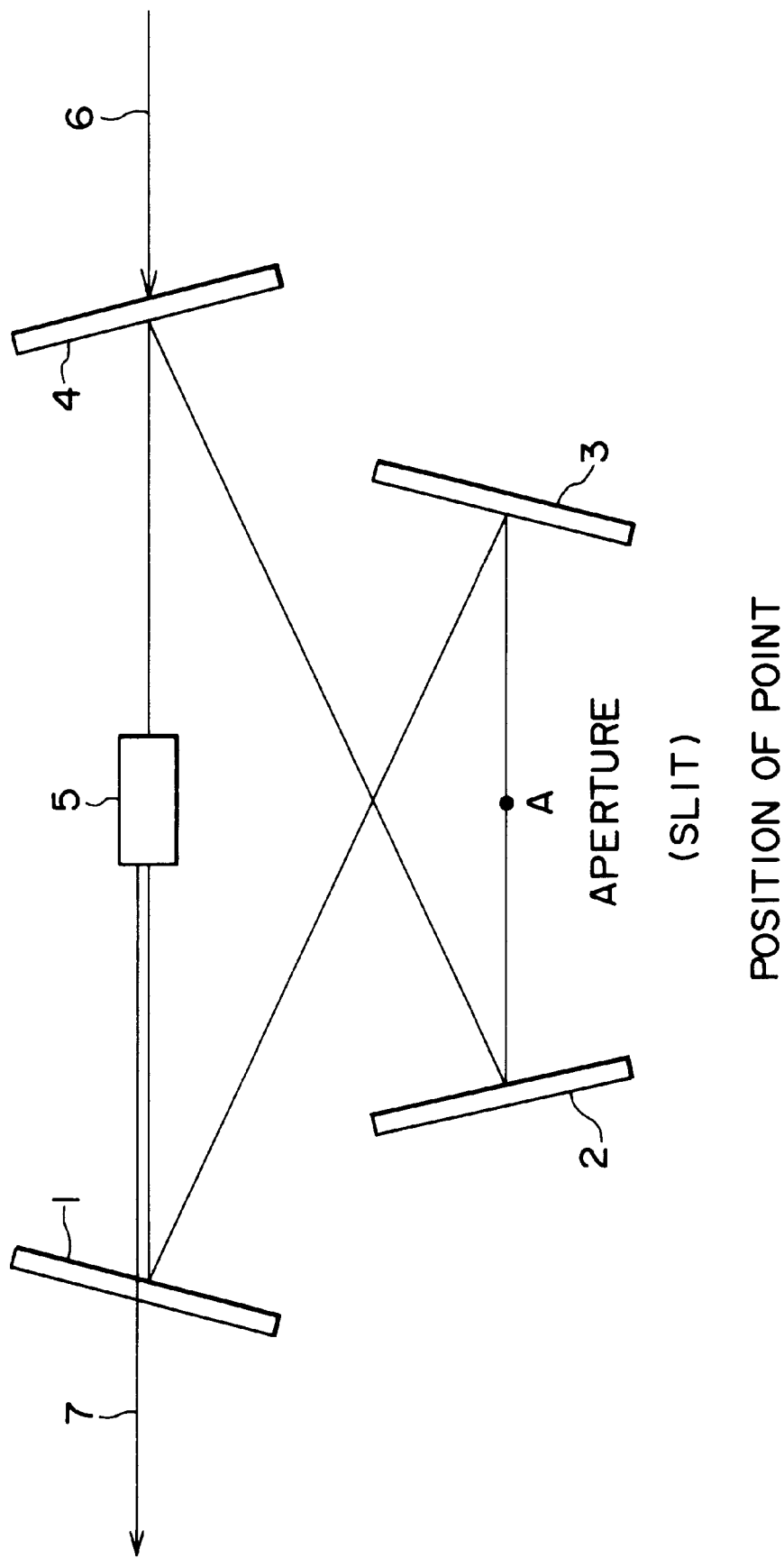
FIG. 1 is a diagram for illustrating a structure of a first embodiment of the present invention.

Embodiments of the present invention will be described hereinafter in detail with reference to the drawings. However, the present invention is by no means limited by the embodiments described hereinafter.

In the first place, an optical system having a resonator in accordance with the present invention is an optical system having at least one optical part other than mirrors in a stable resonator, wherein said optical system is provided with, on at least one point in the stable resonator, an aperture having a circular hole with a diameter 1 to 10 times the beam diameter at each point. Alternatively, an optical system having a resonator in accordance with the present invention is an optical system having at least one optical part other than mirrors in an external resonator, wherein said optical system is provided with, on at least one point in the external resonator, an aperture having a circular hole with a diameter 1 to 10 times the beam diameter at each point.

In the second place, an optical system having a resonator in accordance with the present invention is an optical system having at least one optical part other than mirrors in a stable resonator, wherein said optical system is provided with, on at least one point in the stable resonator, a slit having a width 1 to 10 times the beam diameter at each point. Alternatively, an optical system having a resonator in accordance with the present invention is an optical system having at least one optical part other than mirrors in an external resonator, wherein said optical system is provided with, on at least one point in the external resonator, a slit having a width 1 to 10 times the beam diameter a each point. Further, an optical system having a resonator in accordance with the present invention is provided with, on at least one point in a stable resonator, at least two slits having a width 1 to 10 times the beam diameter at each point and intersecting each other at a certain angle. Yet alternatively, an optical system having a resonator in accordance with the present invention is provided with, on at least one point in an external stable resonator, at least two slits having a width 1 to 10 times the beam diameter at each point and intersecting each other at a certain angle. In this case, a wavelength conversion optical system having at least one optical part other than mirrors in an external stable resonator may be provided with, on at least one point in the external stable resonator, at least two slits having a width 1 to 10 times the beam diameter at each point and intersecting each other at a certain angle.

In the third place, an optical system having a resonator in accordance with the present invention is a wavelength conversion optical system having a plurality of mirrors and an optical crystal for functioning as a wavelength conversion element in the stable resonator, and the optical system is provided with, in an arbitrary space in the stable resonator comprising the plurality of mirrors and the optical crystal, an aperture having an edge of an arbitrary shape. Alternatively, a wavelength conversion optical system having a plurality of mirrors and an optical crystal for functioning as a wavelength conversion element in an external stable resonator is provided with, in an arbitrary space in the external stable resonator comprising the plurality of mirrors and the optical crystal, an aperture having an edge of an arbitrary shape.

The above-mentioned aperture or the aperture having an edge may be an aperture having a square hole with a side length of 600 $\mu$m for a beam diameter of 100 $\mu$m.

In the fourth place, an optical system having a resonator in accordance with the present invention is an optical system having at least one optical part other than mirrors in a stable resonator, and the optical system is provided with, on at least one point in the stable resonator, a knife edge having at least one linear or curved edge so that the nearest distance between the beam and the knife edge is 1 to 10 times the beam radius from the beam center. Alternatively, a wavelength conversion optical system having at least one optical part other than mirrors in an external stable resonator is provided with, on at least one point in the external stable resonator, a knife edge having at least one linear or curved edge so that the nearest distance between the beam and the knife edge is 1 to 10 times the beam radius from the beam center.

Detailed embodiments are described hereinafter.

First Embodiment

Figure 7:
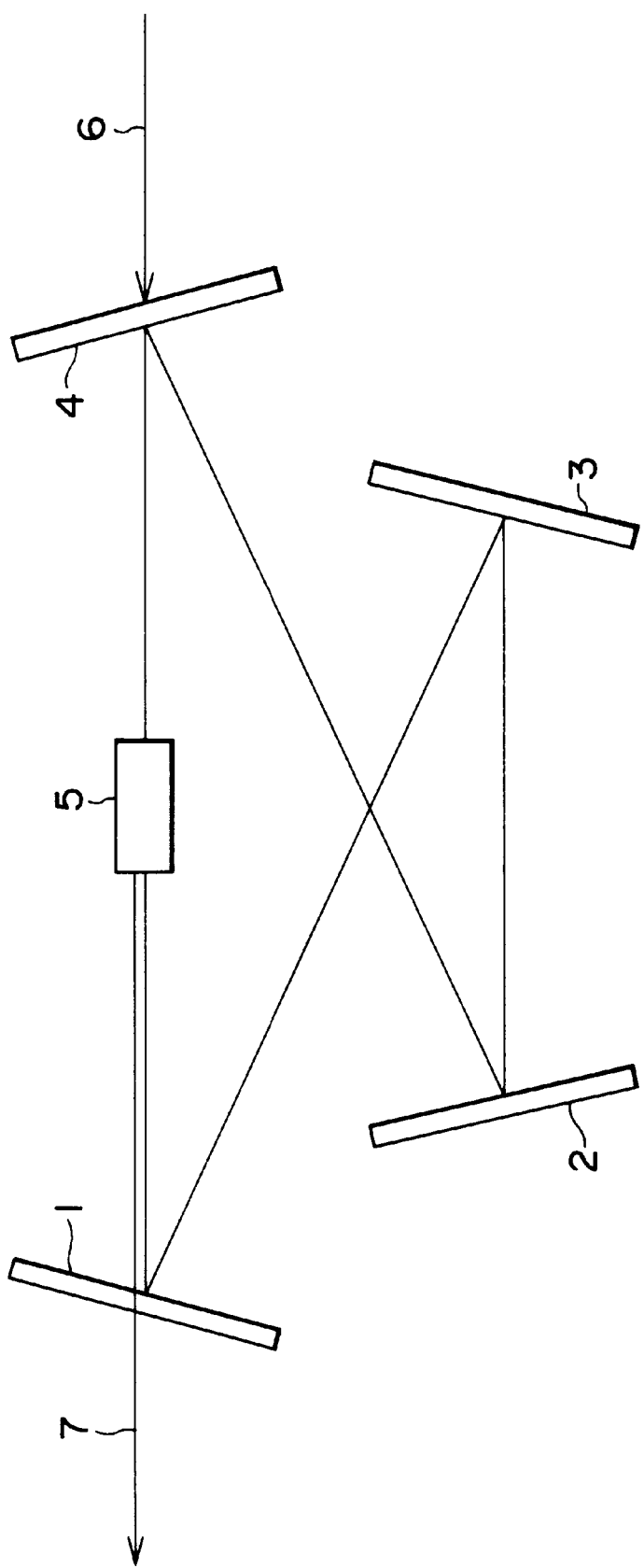
FIG. 7 is a diagram for illustrating a structure of prior art.

This embodiment is used as a wavelength conversion optical system (for example, an ultraviolet light generation optical system) having an external resonator part described using FIG. 7. This example involves a wavelength conversion system provided with a non-linear optical crystal in the external resonator which is modified by applying the present invention.

Figure 3:
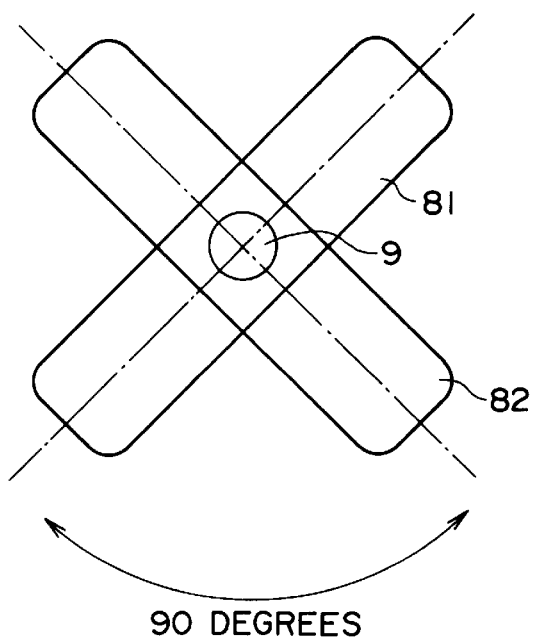
FIG. 3 is a diagram for illustrating a structure (modified example) of the first embodiment of the present invention.

The structure of this example is shown in FIG. 1. The characters 1 to 3 represent high reflectance mirrors having a ultra-high reflectance of, for example 99.95% or higher, at a wavelength of 532 nm as shown in FIG. 3, the character 4 represents an input (incident) mirror having a high reflectance of, for example 99%, at the wavelength of 532 nm, and the character 5 is a non-linear optical crystal BBO having an end mirror-polished surface of a wavelength conversion element provided with a low reflection film having a low reflectance of, for example 0.1% or lower, at the wavelength of 532 nm. As in the prior art, the high reflectance mirror 3, though it is not shown in the drawing, is located on a VCM (refer to J. J. A. P described hereinbefore) that is a positioning device, and controlled by a servo driving system. The elements which are represented by the characters 1 to 5 are components of the external resonator.

A fundamental wave (herein wavelength of 532 nm) shown schematically with the arrow 6 in FIG. 1 is introduced into t he external resonator, the output is amplified between mirrors, the amplified fundamental wave is converted to a second harmonic (herein wavelength of 266 nm) by the non-linear optical crystal 5 (BBO) (the second harmonic is shown schematically with the arrow 7) and in such case, the present invention is applied in order to obtain stable second harmonic output.

In detail, in wavelength conversion using the external stable resonator as shown in FIG. 1, in the case that the beam diameter is 100 μm at the position of the character A shown in FIG. 1, in this embodiment, a circular hole having a diameter of 100 μm to 1 mm or a slit having a width of 100 μm to 1 μm is placed.

Figure 2:
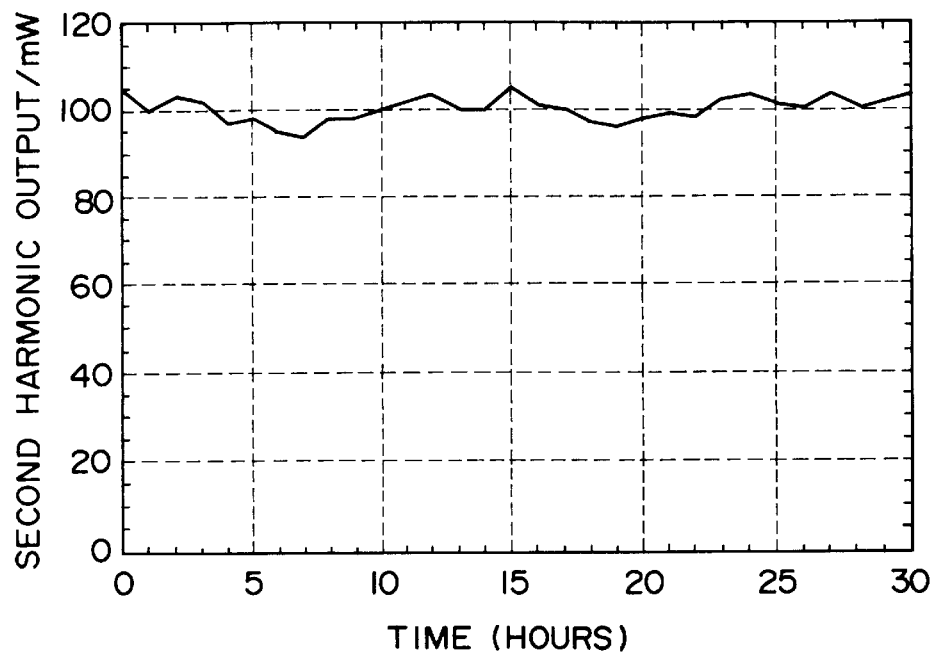
FIG. 2 is a graph for describing an effect of the first embodiment of the present invention.

As a result as shown in FIG. 2, a second harmonic output (axis of ordinate, mW) is stable with respect to time (abscissa, hour). In other words, the harmonic output is obtained stably with time.

On the other hand, in the case that a circular hole having a diameter of 1 mm or larger or a slit with a width of 1 mm is placed under the same conditions, the harmonic output fluctuates as in the case that no aperture (hole) or no slit is placed (refer to FIG. 8). The fluctuation is likely attributed to a transverse mode.

This embodiment is applied preferably as a modified example described herein under. In detail as shown in FIG. 3, at least two slits having a width 1 to 10 times the diameter of a beam at the point A and intersecting each other at a certain angle. The characters 81 and 82 represent these slits (slit 1 and slit 2). In this example, both slits 81 and 82 have a width of 200 μm (the diameter of a beam at the point A is 100 μm) and are intersect each other at an angle of 90 degrees. In this example, a harmonic wave output that is stable with time is preferably obtained.

Second Embodiment

Figure 4A:
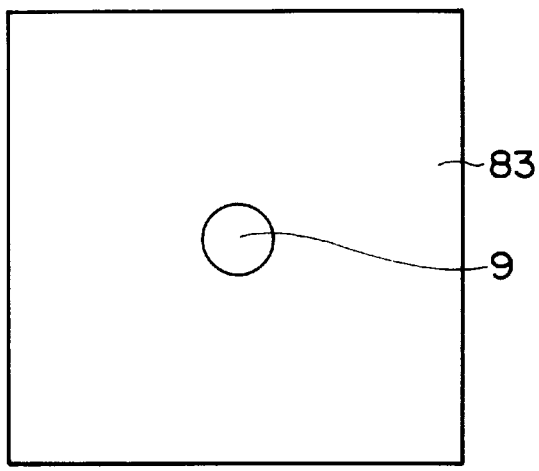
FIG. 4A and FIG. 4B are diagrams for illustrating the structure (1) of a second embodiment of the present invention.
Figure 4B:
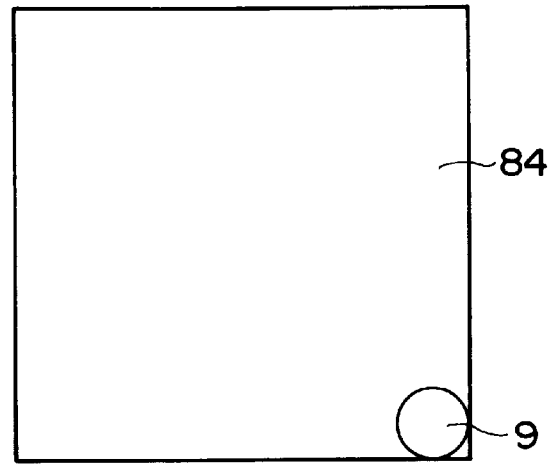

Though in this embodiment, the present invention is applied to a wavelength conversion system having an external resonator part described using FIG. 7 as described in the first embodiment, as shown in FIGS. 4A and 4B, in the case that the diameter of a beam 9 is 100 μm at the point of the character A, two apertures 83 and 84 having a square hole with a side length of 600 μm are placed at the point of the character A. In this case, the aperture may be located so that the beam 9 passes the approximately central portion of the aperture 83 as shown in FIG. 4A, or alternatively the aperture may be located so that the beam 9 passes near the periphery of the aperture 84, for example near a corner of the aperture.

Figure 5A:
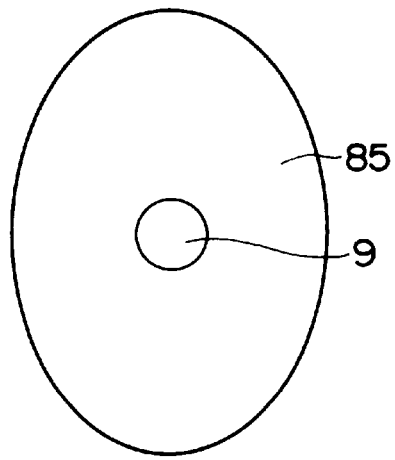
FIG. 5A and FIG. 5B are diagrams for illustrating the structure (2) of the second embodiment of the present invention.
Figure 5B:
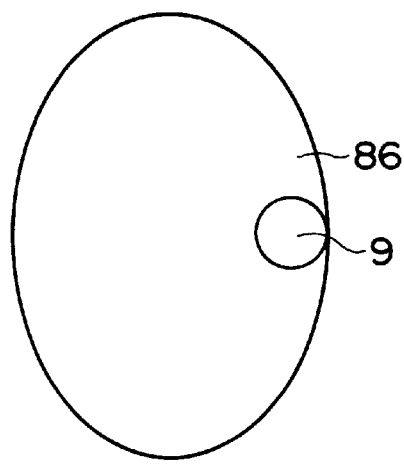

Alternatively, as shown in FIG. 5A and FIG. 5B, elliptical apertures 85 and 86 may be used. In the example shown in FIG. 5A and FIG. 5B, the diameter of a beam 9 is 100 μm at the point of the character A, and the elliptical apertures 85 and 86 have major axes of 600 μm and minor axes of 400 μm. In this case, the aperture 85 may be located so that the beam 9 may pass at an the approximately central portion of the aperture 85 as shown in FIG. 5A, or alternatively the aperture 84 may be located so that the beam 9 passes near the periphery of the aperture 84 as shown in FIG. 5B.

Application of the structure as described in FIG. 4A and FIG. 4B or FIG. 5A and FIG. 5B brings about the same effect as obtained in the first embodiment.

Third Embodiment

The third embodiment is shown in FIG. 6A and FIG. 6B. This example also involves application of the present invention to a wavelength conversion system having an external resonator part described using FIG. 7. In this example, as shown in FIG. 6A and FIG. 6B, a wavelength conversion optical system having, for example, a plurality of mirrors and an optical crystal which functions as a wavelength conversion element in a stable resonator, particularly in an external stable resonator, has a structure provided with an edge 10 in an arbitrary space in the stable resonator comprising the plurality of mirrors and optical crystal.

In detail, in an optical system having at least one optical part other than mirrors in an external stable resonator, at least one knife edge having a linear (example shown in FIG. 6A) or curved (example shown in FIG. 6B) edge 10 is located at at least one point (for example, A point) in the stable resonator so that the nearest distance between the beam 9 and the edge 10 is 1 to 10 times the diameter of the beam from the center of the beam. In this example, the diameter of the beam 9 is 100 μm, and the nearest distance between the knife edge 10 and the beam is 200 μm from the beam.

Application of the structure as described in FIG. 6A and FIG. 6B brings about the same effect as obtained in the first embodiment.

As described hereinbefore, the optical system of the present invention solves the problem of transverse mode generation due to scattering matter and the optical crystal used in the optical system (for example, a wavelength conversion optical system which uses an external stable resonator), and exhibits the effect that a stable output (stable wavelength conversion output) is obtained.

What is claimed is:

1. An optical system having a resonator which is an optical system having at least one optical part other than mirrors in a stable resonator provided with, on at least one point in said stable resonator, an aperture having a circular hole with a diameter of 1 to 10 times the beam diameter at each point, said resonator further comprising a non-linear optical crystal including a borate material, wherein said optical system generates ultraviolet rays.

2. An optical system having a resonator as claimed in claim 1, wherein said optical system is a wavelength conversion optical system having at least one optical part other than mirrors in an external stable resonator, and said optical system is provided with, on at least one point in said external stable resonator, an aperture having a circular hole with a diameter of 1 to 10 times the beam diameter at each point.

3. An optical system having a resonator which is an optical system having at least one optical part other than mirrors in a stable resonator provided with, on at least one point in said stable resonator, a slit having a width 1 to 10 times the beam diameter at each point, said resonator further comprising a non-linear optical crystal including a borate material, wherein said optical system generates ultraviolet rays.

4. An optical system having a resonator as claimed in claim 3, wherein said optical system is a wavelength conversion optical system having at least one optical part other than mirrors in an external stable resonator, and said optical system is provided with, on at least one point in said external stable resonator, a slit having a width 1 to 10 times the beam diameter at each point.

5. An optical system having a resonator which is an optical system having at least one optical part other than mirrors in a stable resonator provided with, on at least one point in said stable resonator, a slit having a width 1 to 10 times the beam diameter at each point, wherein said optical system is an optical system having at least one optical part other than mirrors in a stable resonator, and said optical system is provided with, on at least one point in said stable resonator, at least two slits having a width 1 to 10 times the beam diameter at each point which intersect each other at a certain angle.

6. An optical system having a resonator which is an optical system having at least one optical part other than mirrors in a stable resonator provided with, on at least one point in said stable resonator, a slit having a width 1 to 10 times the beam diameter at each point, wherein said optical system is a wavelength conversion optical system having at least one optical part other than mirrors in an external stable resonator, and said optical system is provided with, on at least one point in said external stable resonator, at least two slits having a width 1 to 10 times the beam diameter at each point which intersect each other at a certain angle.

7. An optical system having a resonator which is a wavelength conversion optical system having a plurality of mirrors and a non-linear optical crystal including a borate material for functioning as a wavelength conversion element in a resonator provided with, on an arbitrary space in said resonator comprising said plurality of mirrors and optical crystal, an aperture having an edge of arbitrary shape, wherein said system generates ultraviolet rays.

8. An optical system having a resonator as claimed in claim 7, wherein said optical system is a wavelength conversion optical system having a plurality of mirrors and an optical crystal for functioning as a wavelength conversion element in an external stable resonator, and said optical system is provided with, in an arbitrary space in said external stable resonator comprising said plurality of mirrors and optical crystal, an aperture having an edge of arbitrary shape.

9. An optical system having a resonator having at least one optical part other than mirrors in a stable resonator provided with, on at least one point in said stable resonator, a knife edge having at least one linear or curved edge so that the nearest distance between said beam and said knife edge is 1 to 10 times the beam radius from the center of said beam, said resonator further comprising a non-linear optical crystal including a borate material, wherein said optical system generates ultraviolet rays.

10. An optical system having a resonator as claimed in claim 9, wherein said optical system is a wavelength conversion optical system having at least one optical part other than mirrors in an external stable resonator, and said optical system is provided with, on at least one point in said external stable resonator, a knife edge having at least one linear or curved edge so that the nearest distance between said beam and said knife edge is 1 to 10 times the beam radius from the center of said beam.

11. An optical system having a stable, external resonator which is an optical system having at least one optical part other than mirrors in said stable external resonator provided with, on at least one point in said stable external resonator, an aperture having a circular hole with a diameter that is greater than 1, and less than 10, times the beam diameter at each point, said external resonator further comprising a non-linear optical crystal, wherein said optical system generates ultraviolet rays, and wherein said aperture prevents scattering induced generation of transverse mode rays generated due to scattering at said nonlinear optical crystal such that said optical system produces a stable longitudinal mode output.

12. An optical system having a stable, external resonator as claimed in claim 11, wherein said optical system is a wavelength conversion optical system.

13. An optical system having a stable, external resonator which is an optical system having at least one optical part other than mirrors in said stable resonator provided with, on at least one point in said stable external resonator, a slit having a width that is greater than 1, and less than 10, times the beam diameter at each point, said resonator further comprising a non-linear optical crystal, wherein said optical system generates ultraviolet rays, and wherein said slit prevents scattering induced generation of transverse mode rays generated due to scattering at said nonlinear optical crystal such that said optical system produces a stable longitudinal mode output.

14. An optical system having a stable, external resonator as claimed in claim 13, wherein said optical system is a wavelength conversion optical system.

15. An optical system having a resonator which is a wavelength conversion optical system having a plurality of mirrors and a nonlinear optical crystal for functioning as a wavelength conversion element in a stable, external resonator provided with, on an arbitrary space in said stable external resonator comprising said plurality of mirrors and optical crystal, an aperture having a dimension that is greater than 1, and less than 10, times the beam diameter at each point and having an edge of arbitrary shape, wherein said optical system generates ultraviolet rays, and wherein said aperture prevents scattering induced generation of transverse mode rays generated due to scattering at said nonlinear optical crystal such that said optical system produces a stable longitudinal mode output.

16. An optical system having a stable, external resonator having at least one optical part other than mirrors in a stable resonator provided with, on at least one point in said stable resonator, a knife edge having at least one linear or curved edge so that the nearest distance between a beam and said knife edge is greater than 1, and less than 10, times a beam radius from the center of said beam, said resonator further comprising a non-linear optical crystal, wherein said optical system generates ultraviolet rays, and wherein said knife-edge prevents scattering induced generation of transverse mode rays generated due to scattering at said nonlinear optical crystal such that said optical system produces a stable longitudinal mode output.

17. An optical system having a stable, external resonator as claimed in claim 16, wherein said optical system is a wavelength conversion optical system.

18. A method for generating stable longitudinal mode output ultraviolet rays, comprising the steps of:

generating light rays having a fundamental wavelength that is greater than an ultraviolet wavelength;

resonating said light rays in a stable, external resonator;

generating a harmonic within said stable, external resonator by passing said fundamental wave through a nonlinear optical crystal; and blocking rays scattered outside of a beam dimension with an aperture having dimensions greater than 1, and less than 10, times the beam dimension at each point, thereby preventing scattering induced generation of transverse mode rays generated due to scattering at said nonlinear optical crystal such that an optical system produces a stable longitudinal mode output.

* * * * *